United States Patent
Arnold

(10) Patent No.: US 7,849,949 B2
(45) Date of Patent: Dec. 14, 2010

(54) MOTORCYCLE HAVING A CONTINUOUSLY VARIABLE TRANSMISSION

(75) Inventor: David W. Arnold, Glendale, CA (US)

(73) Assignee: Honda Motor Company, Ltd., Tokyo (JP)

( * ) Notice: Subject to any disclaimer, the term of this patent is extended or adjusted under 35 U.S.C. 154(b) by 301 days.

(21) Appl. No.: 12/044,072

(22) Filed: Mar. 7, 2008

(65) Prior Publication Data
US 2009/0223730 A1 Sep. 10, 2009

(51) Int. Cl.
*B62D 61/02* (2006.01)
*B62K 11/00* (2006.01)
*B62M 9/00* (2006.01)

(52) U.S. Cl. .................. 180/231; 180/227; 180/230

(58) Field of Classification Search .............. 180/219, 180/227, 228, 230, 231
See application file for complete search history.

(56) References Cited

U.S. PATENT DOCUMENTS

| | | | |
|---|---|---|---|
| 2,458,720 A | 1/1949 | Mertz | |
| 3,747,721 A | 7/1973 | Hoff | |
| 4,039,200 A | 8/1977 | McGonegle | |
| 4,408,674 A | 10/1983 | Boyesen | |
| 4,494,622 A | 1/1985 | Thompson | |
| 4,633,964 A | 1/1987 | Boyer et al. | |
| 4,655,310 A | 4/1987 | Hoshi | |
| 4,671,375 A | 6/1987 | Oike et al. | |
| 4,671,525 A | 6/1987 | Ribi | |
| 4,705,494 A | 11/1987 | Gibson | |
| 4,742,884 A | 5/1988 | Ishikawa | |
| 4,951,791 A | 8/1990 | Belil | |
| 5,050,699 A | 9/1991 | Savard | |
| 5,172,786 A | 12/1992 | Ishibashi et al. | |
| 5,282,517 A | 2/1994 | Prince | |
| 5,531,289 A | 7/1996 | Muramatsu | |
| 6,006,715 A | 12/1999 | Izumi et al. | |
| 6,397,964 B1 | 6/2002 | Yamauchi | |
| 6,454,037 B1 | 9/2002 | Atsuumi et al. | |
| 6,513,613 B2 | 2/2003 | Suzuki et al. | |
| 6,591,934 B2 | 7/2003 | Tsutsumikoshi | |
| 6,808,465 B2 * | 10/2004 | Kuga et al. .................. 474/14 |
| 7,083,022 B2 | 8/2006 | McWhorter et al. | |
| 7,121,570 B2 | 10/2006 | Parker | |
| 7,225,892 B1 | 6/2007 | Berthiaume | |
| 7,316,626 B2 | 1/2008 | Oishi et al. | |
| RE40,289 E | 5/2008 | Atsuumi et al. | |
| 7,392,870 B2 * | 7/2008 | Kojima et al. ............ 180/65.25 |
| 7,434,645 B2 | 10/2008 | Iizuka et al. | |

(Continued)

OTHER PUBLICATIONS

U.S. Appl. No. 12/044,190, Titled: Motorcycle Having a Continuously Variable Transmission and a Reduction Gearset, Filed: Mar. 7, 2008, Inventor: David W. Arnold, in its entirety.

(Continued)

*Primary Examiner*—Lesley Morris
*Assistant Examiner*—Marc A Scharich
(74) *Attorney, Agent, or Firm*—Ulmer & Berne LLP

(57) ABSTRACT

A motorcycle includes a frame and an engine supported by the frame. A continuously variable transmission is operatively and indirectly driven by the engine and is supported by the frame. A rotatable rear wheel is operatively and indirectly driven by the continuously variable transmission, which is generally vertically oriented.

16 Claims, 8 Drawing Sheets

U.S. PATENT DOCUMENTS

| | | | |
|---|---|---|---|
| 7,490,688 B2* | 2/2009 | Yamamoto | 180/228 |
| 7,588,111 B2* | 9/2009 | Hayashi et al. | 180/227 |
| 2002/0027032 A1 | 3/2002 | Tsutsumikoshi | |
| 2004/0171449 A1 | 9/2004 | Oishi et al. | |
| 2005/0156000 A1* | 7/2005 | Kamemizu et al. | 224/413 |
| 2005/0241867 A1 | 11/2005 | Abe et al. | |
| 2006/0065458 A1* | 3/2006 | Wachigai et al. | 180/219 |
| 2006/0102406 A1* | 5/2006 | Iizuka et al. | 180/227 |
| 2006/0219457 A1 | 10/2006 | Sato et al. | |
| 2008/0183359 A1* | 7/2008 | Sawada | 701/54 |

OTHER PUBLICATIONS

Jacob D. Knutson, Office Action and PTO-892, Notification Date of Mar. 6, 2009, U.S. Appl. No. 12/044,190, Titled: Motorcycle Having a Continuously Variable Transmission and a Reduction Gearset, filed Mar. 7, 2008, Inventor: David W. Arnold, 9 pages.

Jacob D. Knutson, Official Action, Notification date of Oct. 8, 2009, U.S. Appl. No. 12/044,190, Titled: Motorcycle Having a Continuously Variable Transmission and a Reduction Gearset, filed: Mar. 7, 2008, Inventor: David W. Arnold, 10 pages.

Jacob D. Knutson, Office Action and PTO-892, Notification Date of Feb. 5, 2010, U.S. Appl. No. 12/044,190, Titled: Motorcycle Having a Continuously Variable Transmission and a Reduction Gearset, filed Mar. 7, 2008, Inventor: David W. Arnold, 15 pages.

Jacob D. Knutson, Office Action and PTO-892, Notification Date of Jul. 15, 2010, U.S. Appl. No. 12/044,190, Titled: Motorcycle Having a Continuously Variable Transmission and a Reduction Gearset, filed Mar. 7, 2008, Inventor: David W. Arnold, 12 pages.

* cited by examiner

MOTORCYCLE HAVING A CONTINUOUSLY VARIABLE TRANSMISSION

CROSS REFERENCES

This application is related to co-pending and commonly assigned U.S. patent application entitled "Motorcycle Having a Continuously Variable Transmission and a Reduction Gearset," having Ser. No. 12/044,190, filed concurrently herewith, which is expressly incorporated by reference herein in its entirety.

TECHNICAL FIELD

The present invention is related to motorcycles, and more particularly, to motorcycles having a continuously variable transmission.

BACKGROUND

Scooters having drivetrains that include continuously variable transmissions, such as pulley-based continuously variable transmissions, are known. In these applications, the continuously variable transmissions can contribute to the overall width of the particular scooter.

Scooters are known that include a reduction gearset positioned at the hub of the rear wheel of the scooter. Such a location of the reduction gearset can result in a bulky appearance. Motorcycles are known that include reduction gearsets within the transmission of the motorcycle.

SUMMARY

According to one embodiment, a motorcycle is provided that includes a frame and an engine supported by the frame. A continuously variable transmission is operatively and indirectly driven by the engine and is supported by the frame. A rotatable rear wheel is operatively and indirectly driven by the continuously variable transmission. The continuously variable transmission is generally vertically oriented.

According to another embodiment, a motorcycle is provided that includes a frame and an engine supported by the frame. A continuously variable transmission is operatively and indirectly driven by the engine. A rear wheel is operatively and indirectly driven by the continuously variable transmission, which is positioned forward of the rear wheel and rearward of the engine.

According to another embodiment, a motorcycle is provided that includes a frame, an engine supported by the frame and a continuously variable transmission. A first flexible drive member couples the engine and the continuously variable transmission. A rotatable wheel is coupled to the continuously variable transmission, which is generally vertically oriented.

BRIEF DESCRIPTION OF THE DRAWINGS

Various features and advantages of the present invention will become better understood with regard to the following description, appended claims and accompanying drawings wherein:

DETAILED DESCRIPTION

Figure 1:
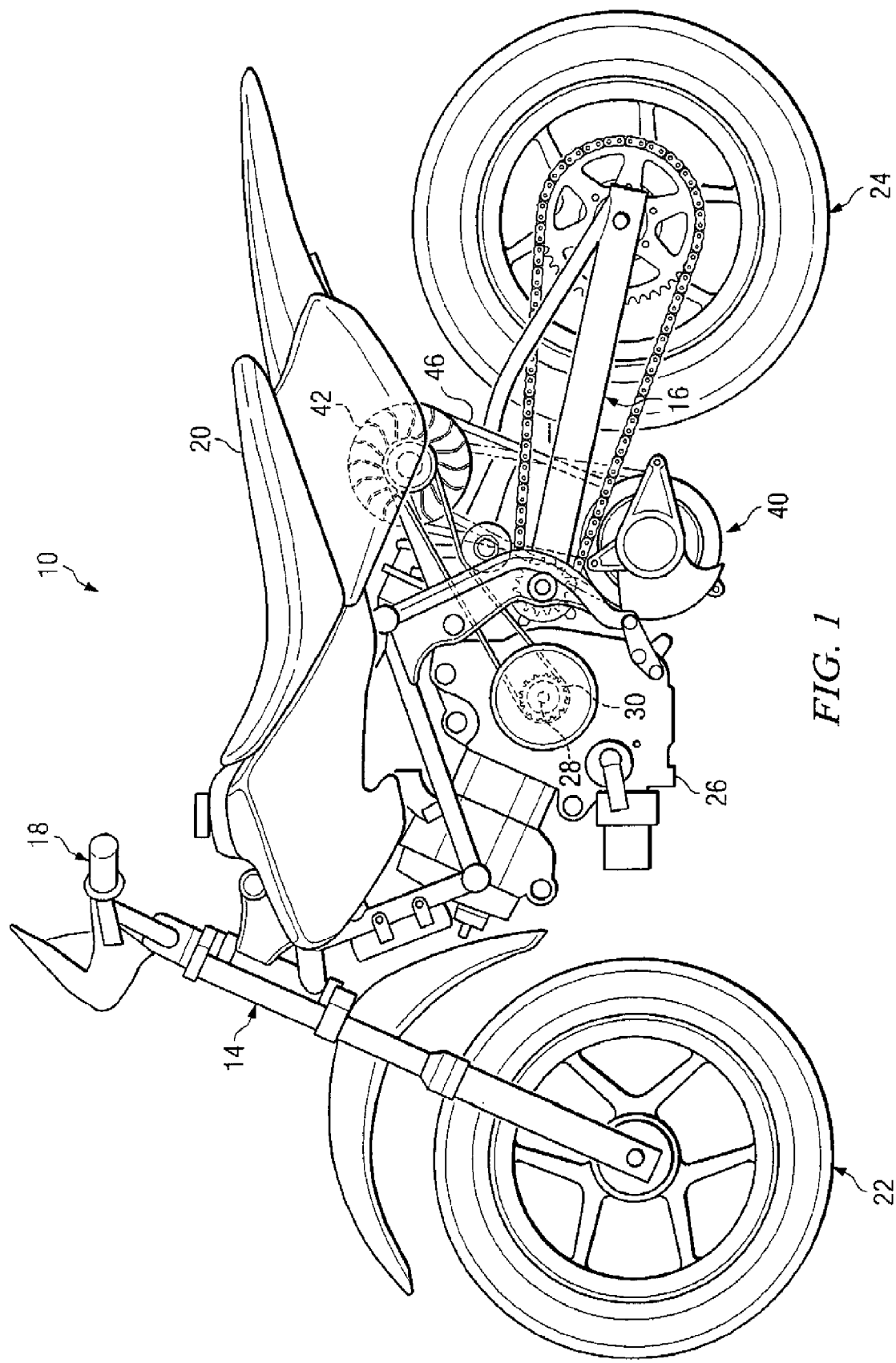
FIG. 1 is a left side elevation view of a motorcycle according to one embodiment.

FIG. 1 illustrates a motorcycle 10 that includes a front fork assembly 14, a swing-arm assembly 16, a handlebar assembly 18 and a seat 20, each of which are associated with a frame 12. Motorcycle 10 further includes a front wheel 22 rotatably coupled to the front fork assembly 14 and a rear wheel 24 rotatably coupled to the swing-arm assembly 16.

Figure 2:
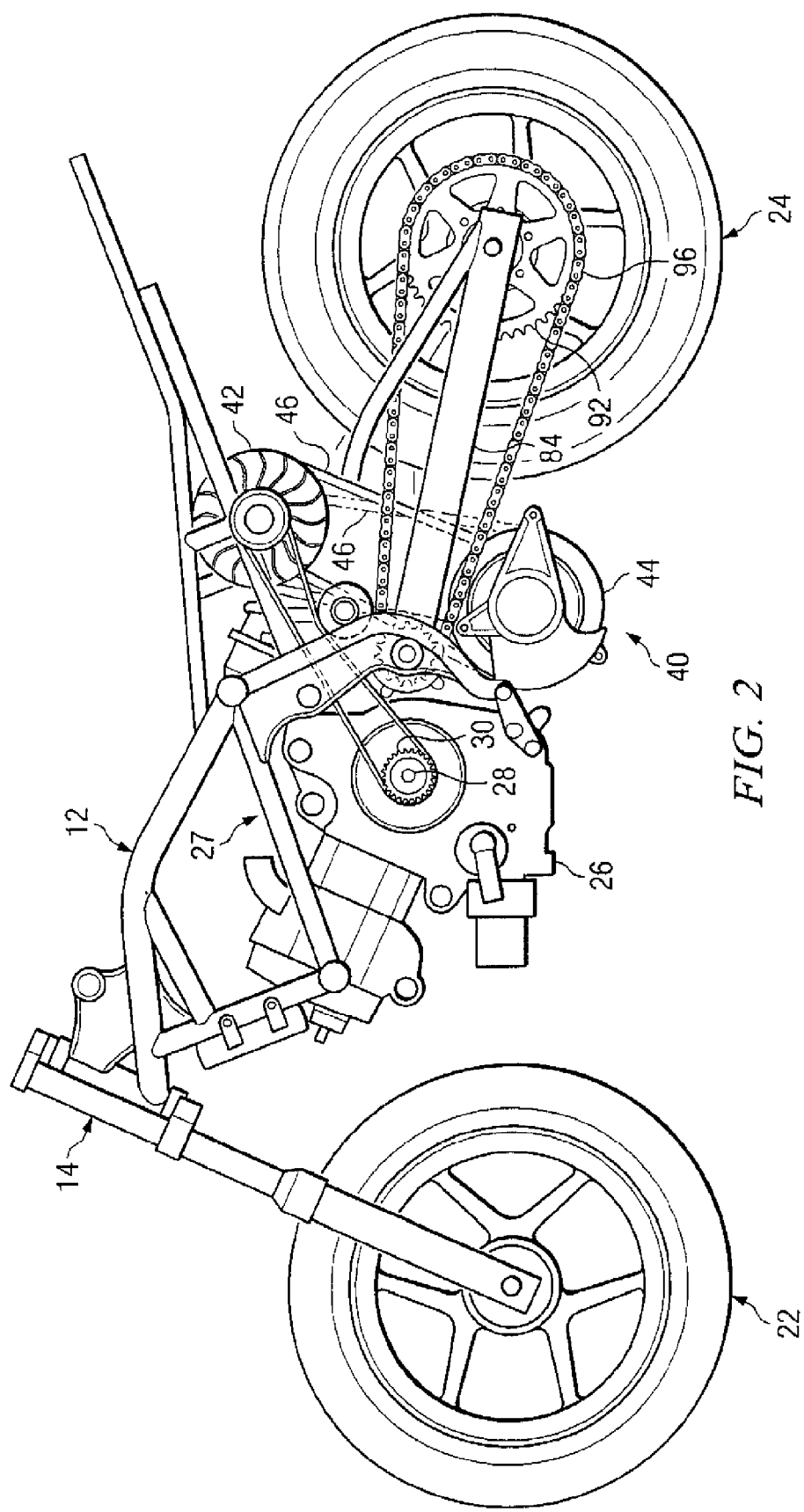
FIG. 2 is a left side elevation view of the motorcycle shown in FIG. 1, with portions of the motorcycle omitted for clarity.

Motorcycle 10 also includes an engine 26, which can be an internal combustion engine and/or other suitable source of motive power (e.g., an electric motor) that is supported by frame 12. Engine 26 is drivingly coupled to rear wheel 24. A drivetrain is provided to transmit motive power from engine 26 to rear wheel 24 as subsequently described. Frame 12 includes a plurality of interconnected members and one or more of these members can have a tubular construction. Frame 12 can include a cradle portion, indicated generally at 27 (FIG. 2), which at least partially surrounds and supports engine 26.

Figure 3:
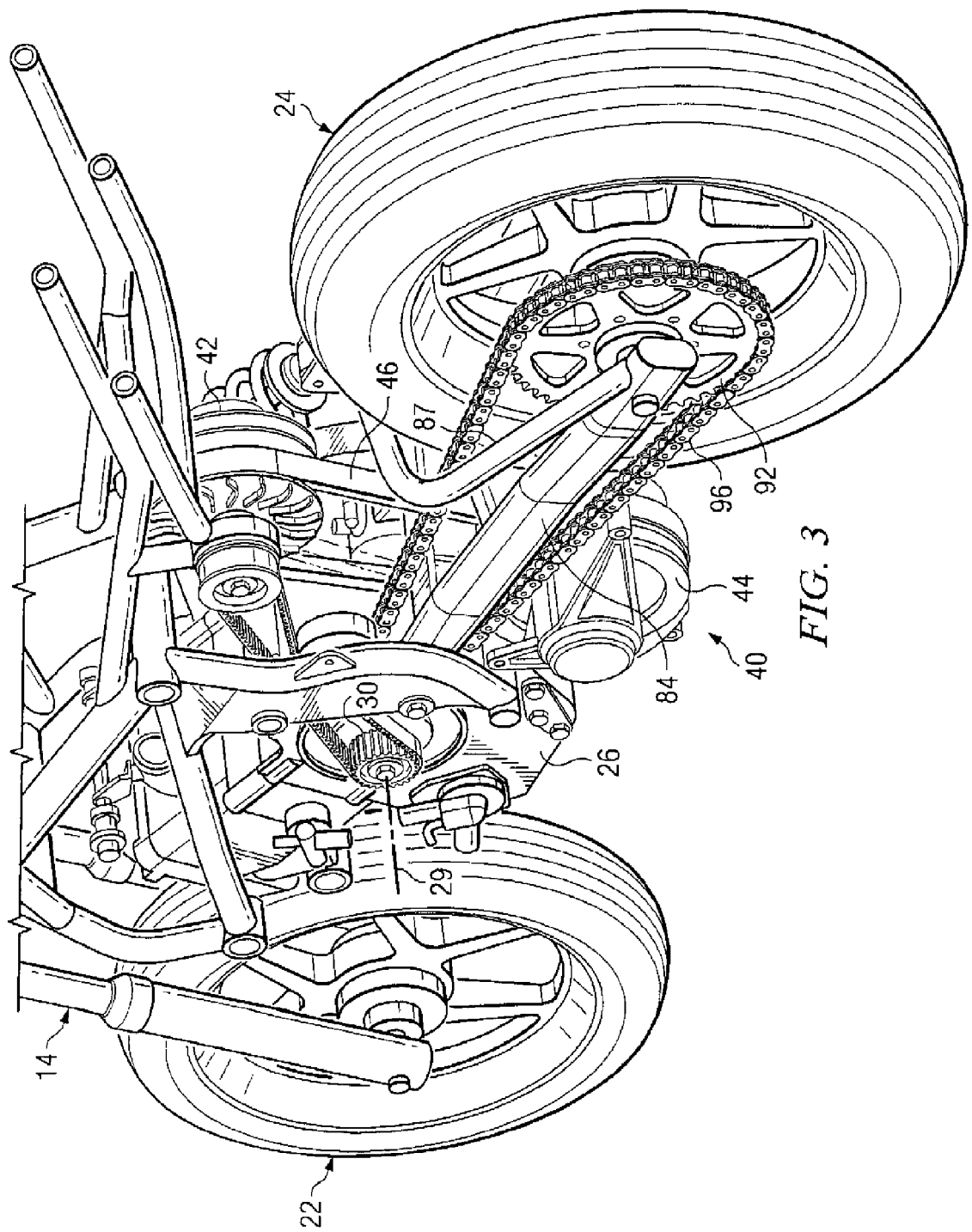
FIG. 3 is a left side perspective view of the motorcycle shown in FIGS. 1 and 2, with portions of the motorcycle omitted for clarity.
Figure 4:
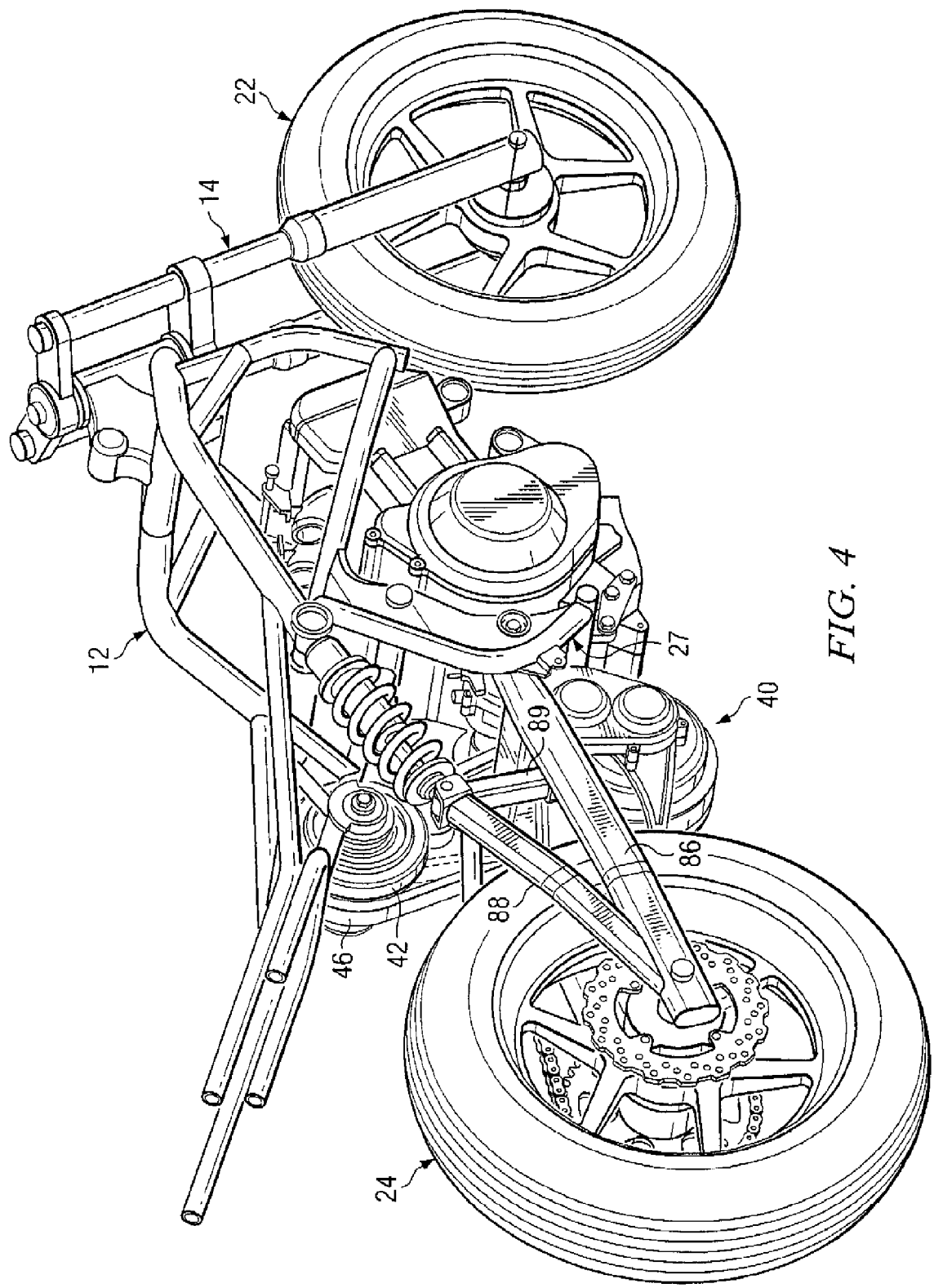
FIG. 4 is a right side perspective view of the motorcycle shown in FIGS. 1-3, with portions of the motorcycle omitted for clarity.

Engine 26 includes a crankshaft 28 that has an axis of rotation 29 (FIG. 3). An output wheel 30 can be mounted on crankshaft 28 for rotation therewith. Output wheel 30 can have a variety of configurations. For example, output wheel 30 can be a pulley, with or without a plurality of circumferentially spaced teeth positioned about a perimeter thereof. Output wheel 30 can alternatively be a sprocket.

Figure 5:
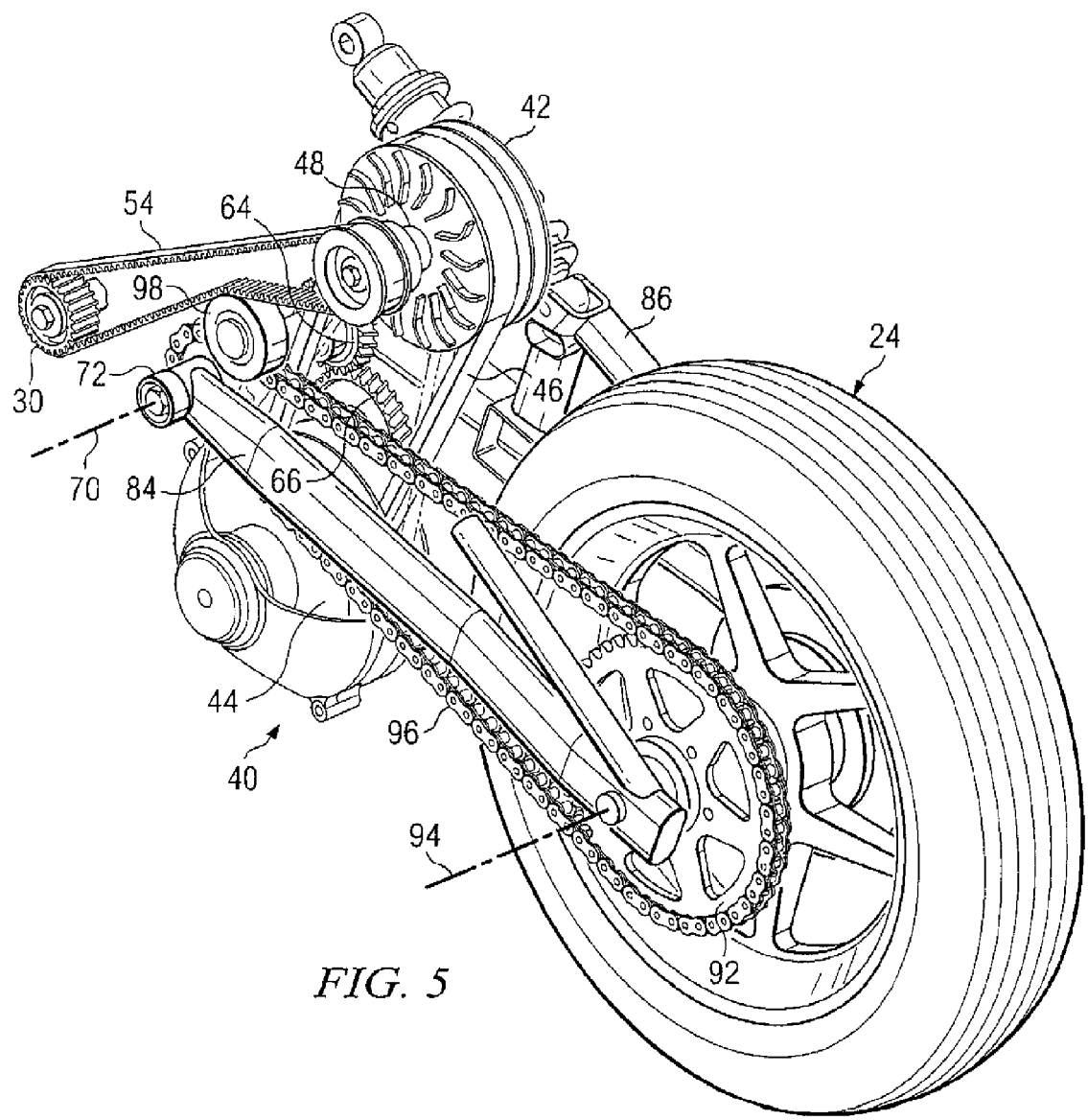
FIGS. 5 and 6 are enlarged, fragmentary left side perspective views of the motorcycle shown in FIGS. 1-4.

Motorcycle 10 includes a continuously variable transmission (CVT) 40 that is operatively and indirectly driven by engine 26. CVT 40 includes a rotatable input member 42, which is shown to be a drive pulley in FIGS. 1-8, and a rotatable output member 44, which is shown to be a driven pulley in FIGS. 1-8. The drive pulley is coupled to the driven pulley by a flexible drive member 46, which can be a belt, such as a V-belt. An input shaft 48 (FIG. 5), having a centerline axis 49 (FIG. 6), is shown to be rotatably coupled to input member 42. An output shaft 50 (FIG. 7), having a centerline axis 51 (FIG. 7), is shown to be rotatably coupled to output member 44. The centerline axis 49 of input shaft 48 can also be the axis of rotation of rotatable input member 42 of CVT 40. The centerline axis 51 of output shaft 50 can also be the axis of rotation of rotatable output member 44 of CVT 40.

Figure 6:
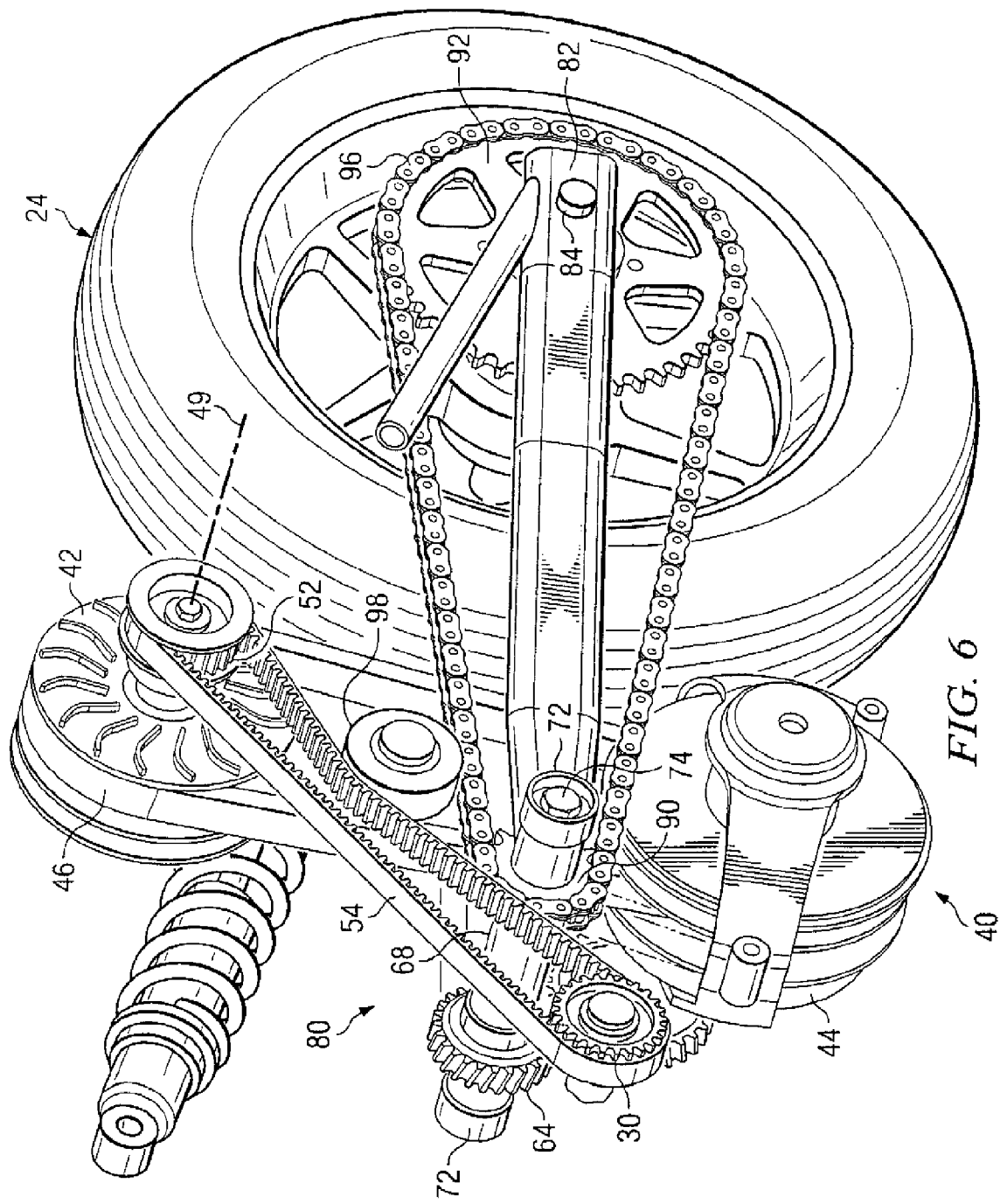

An input wheel 52 (FIG. 6) is shown to be mounted on input shaft 48 for rotation therewith. The configuration of input wheel 52 is complementary with the configuration of output wheel 30 mounted on crankshaft 28, e.g., a toothed or toothless pulley or a sprocket. Output wheel 30 and input wheel 52 are shown in FIG. 6 to be toothed pulleys. As shown in FIG. 6, wheel 30 can be coupled with wheel 52, which couples crankshaft 28 with input shaft 48 of CVT 40, by an endless, flexible drive member 54 that is wound partially around and extends between output wheel 30 and input wheel 52. The flexible drive member 54 can be a cogged belt. In other embodiments, the flexible drive member 54 can be a smooth belt, such as a V-belt, or a drive chain, for example when wheels 30 and 52 are toothless pulleys or sprockets, respectively. The coupling of crankshaft 28 with input shaft 48 of CVT 40, indirectly couples engine 26 with CVT 40. Output wheel 30 and input wheel 52 can be configured to achieve about a 1:1 gear ratio so that crankshaft 28 of engine 26 and input shaft 48 of CVT 40 rotate at about the same speed, which can be an optimum operational speed for CVT 40.

CVT 40 can provide an unlimited number of gear ratios from low to high gear that can be achieved in a stepless or smooth manner during operation. This can be achieved with pulley-based CVT's as follows. The drive pulley and the driven pulley can each include a pair of cones that face each other and a groove between the cones to accept a belt. The drive pulley and the driven pulley each include a pitch radius. Pitch radius is the radial distance between the center of the pulley and the location where the belt makes contact in the groove, for each respective pulley. The gear ratio of CVT 40 can be varied by varying the pitch radius of the drive pulley and the driven pulley.

The construction and operation of pulley-based CVTs, such as CVT 40, are well known in the art and will not be described in greater detail herein. In other embodiments, motorcycle 10 can include CVTs having alternate configurations. For example, a toroidal CVT can be used instead of the pulley-based CVT 40 shown in FIGS. 1-8. In this embodiment, the drive pulley, the driven pulley and the flexible drive member 46 of CVT 40 would be replaced with a pair of discs spaced apart from one another and a pair of power rollers, each in contacting engagement with both discs. One of the discs would be coupled to engine 26 and the other disc would be coupled to rear wheel 24. The construction and operation of toroidal CVTs are also well-known in the art and will not be described further herein.

Figure 7:
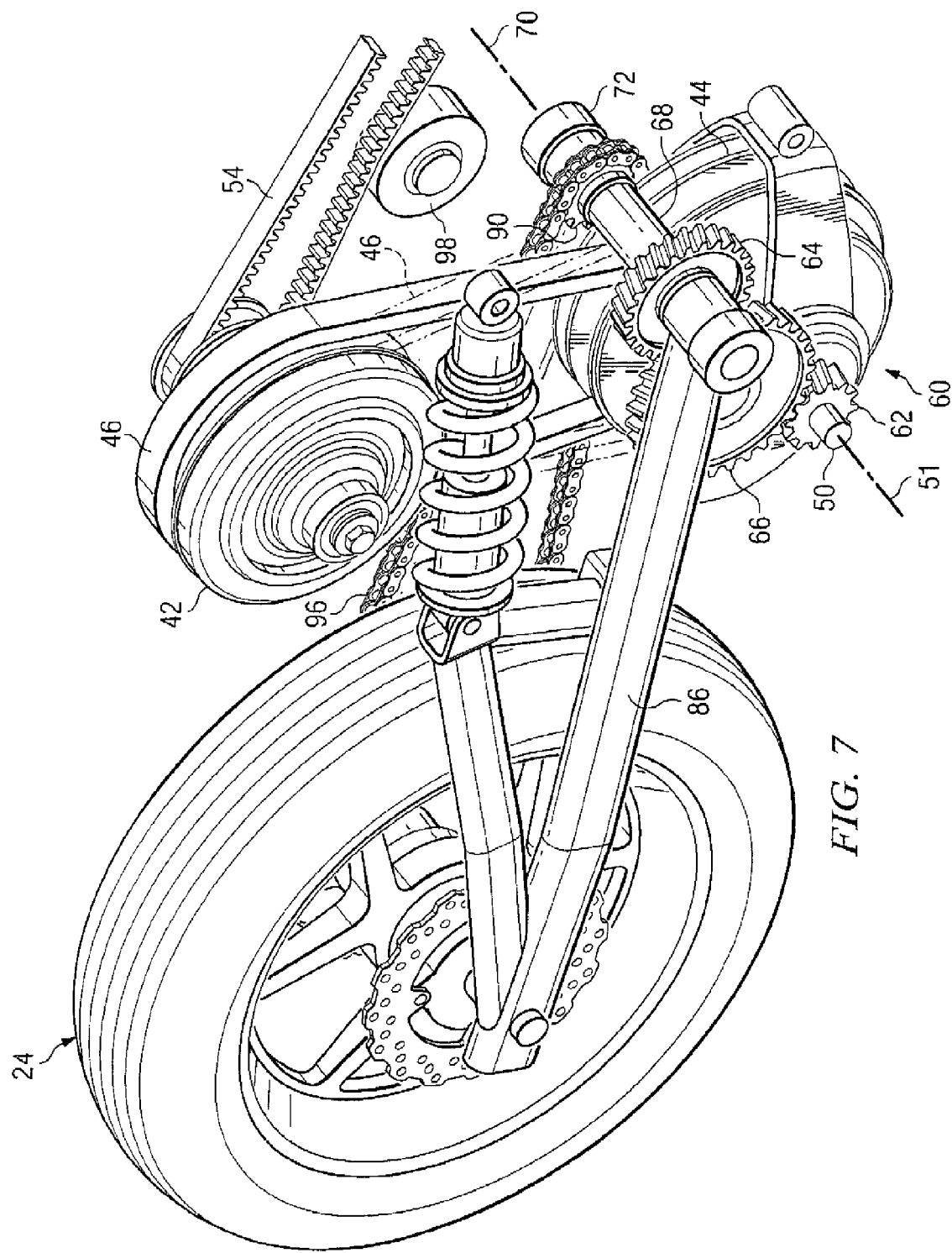
FIGS. 7 and 8 are enlarged, fragmentary right side perspective views of the motorcycle shown in FIGS. 1-6.
Figure 8:
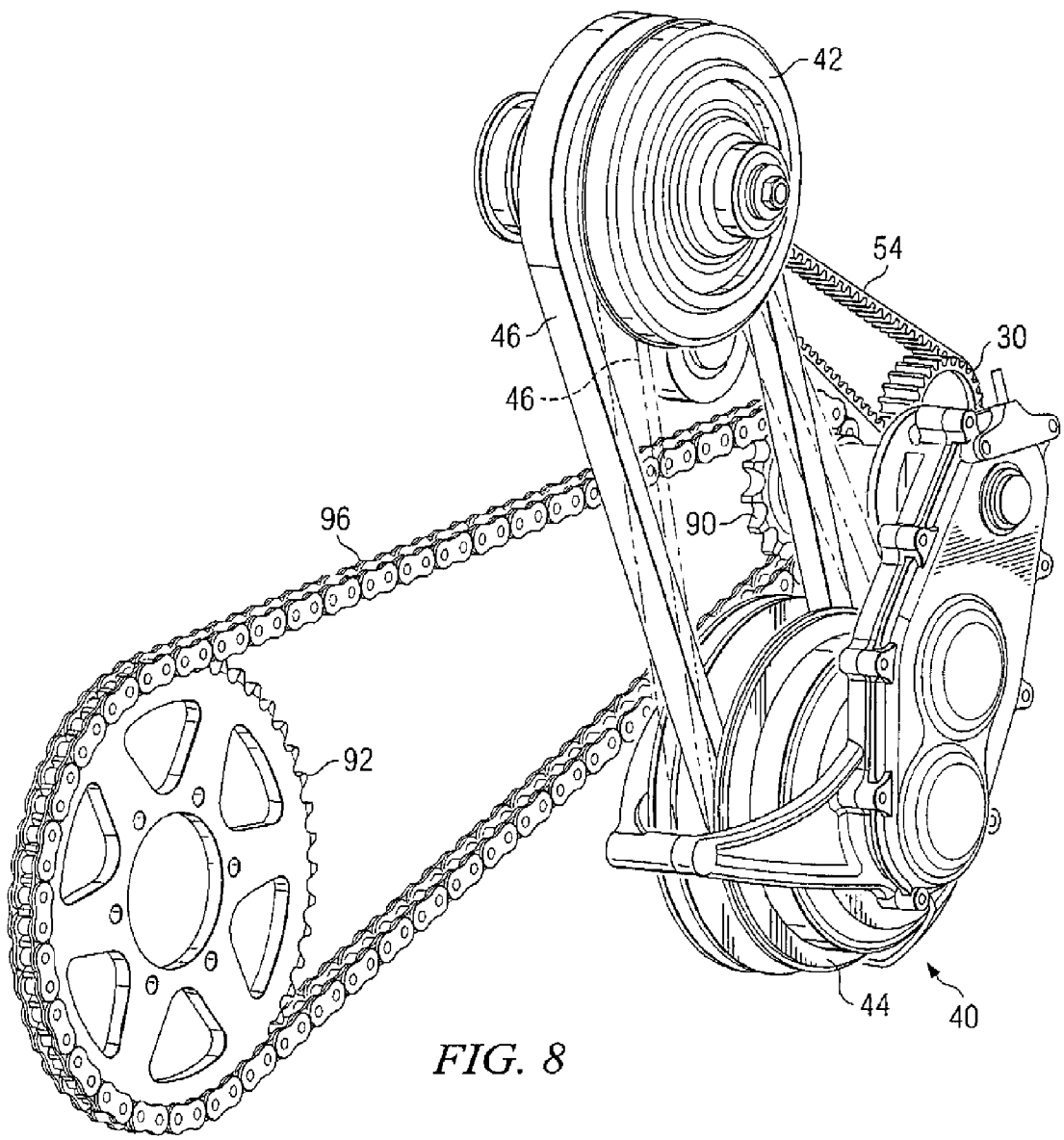

Motorcycle 10 can include a reduction gearset indicated generally at 60 in FIG. 7. Reduction gearset 60 is operatively driven by CVT 40 and is positioned forward of rear wheel 24. Reduction gearset 60 can include an input gear 62, an output gear 64 and an intermediate gear 66 that meshes with input gear 62 and output gear 64. The size and configuration of gears 62, 64 and 66 can be varied to achieve the desired gear ratio of reduction gearset 60 for each particular application.

The input gear 62 of gearset 60 can be coaxially mounted on the output shaft 50 of CVT 40, for rotation with shaft 50. Intermediate gear 66 can be rotatably supported by swing-arm assembly 16 and/or frame 12 and output gear 64 can be mounted on a pivot shaft 68 that is rotatably supported by frame 12. Pivot shaft 68 defines a pivot axis 70 (FIG. 7). In one embodiment pivot shaft 68 is journalled within a pair of bearing assemblies 72, which are laterally spaced. Pivot shaft 68 can have a hollow interior (not shown) or alternatively, pivot shaft 68 can have a solid construction. In one embodiment, a fastener 74 (FIG. 6), such as a bolt, can pass into or through a hollow interior (not shown) of pivot shaft 68 and can be used in conjunction with a nut (not shown) to secure bearing assemblies 72 to frame 12. The input gear 62 of gearset 60 can be rearward of pivot axis 70 and the output gear 64 of gearset 60 can be coaxially mounted on pivot shaft 68.

Swing-arm assembly 16 can be pivotably mounted, at a forward end 80, on frame 12 such that swing-arm assembly 16 can pivot, or rotate, about pivot axis 70. Swing-arm assembly 16 can be rotatably coupled, at a rear end 82, to rear wheel 24. Swing-arm assembly 16 can include elongated and laterally spaced fork members 84 and 86. The swing arm assembly 16 can include one or more reinforcement members, such as reinforcement member 87 (FIG. 3) and reinforcement members 88 and 89 (FIG. 4), to enhance the structural rigidity of swing arm assembly 16.

A forward end of each fork member 84, 86 can be pivotably mounted on frame 12. A rear end of each fork member 84, 86 can be rotatably coupled to rear wheel 24. As may be appreciated with reference to FIGS. 5 and 6, the forward ends of fork members 84, 86 can be positioned laterally between the respective bearing assemblies 72 and the pivot shaft 68. Interface hardware (not shown) such as washers and/or bearings can be positioned laterally between the forward ends of fork members 84, 86 and pivot shaft 68.

A drive member 90 can be mounted on pivot shaft 68 for rotation with pivot shaft 68 about pivot axis 70, with drive member 90 being operatively driven by reduction gearset 60. A driven member 92 can be coupled to rear wheel 24 so that rotation of driven member 92 causes rear wheel 24 to rotate about an axis of rotation 94. A flexible drive member 96 couples drive member 90 and driven member 92 and facilitates the coupling of CVT 40 with rear wheel 24. Drive member 90 and driven member 92 are shown to be sprockets and flexible drive member 96 is shown to be a chain in FIGS. 1-8. Alternatively, drive member 90 and driven member 92 can be toothed pulleys (not shown). In this embodiment the flexible drive member 96 would be a cogged belt (not shown). The final drive ratio change of motorcycle 10 is achieved with drive member 90, driven member 92 and flexible member 96, as is typical of certain conventional motorcycles. An idler pulley 98 (FIGS. 5 and 6) can be positioned such that it is in contacting engagement with flexible drive members 54 and 96 during operation of motorcycle 10 to provide the desired tension in drive members 54 and 96.

During operation of motorcycle 10, motive power can be transmitted from engine 26 to rear wheel 24 via crankshaft 28, CVT 40, reduction gearset 60, pivot shaft 68, drive member 90, driven member 92 and flexible drive members 54, 46 and 94.

Figure 9:
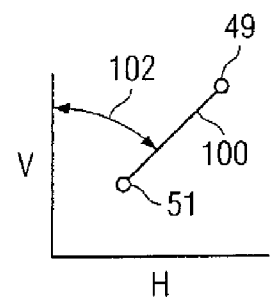
FIG. 9 is a graph illustrating an angular orientation of a continuously variable transmission, according to one embodiment, included in the motorcycle shown in FIGS. 1-8.

As noted previously, CVT 40 can be generally vertically oriented. As used herein, "generally vertically oriented" means that a line 100 (FIG. 9) between the axis of rotation 49 of rotatable input member 42 of CVT 40 and the axis of rotation 51 of the rotatable output member 44 of CVT 40, forms an angle 102 with a vertical axis "V" that is less than 45°, so that line 100 is closer to vertical axis "V" than a horizontal axis "H." As shown in FIGS. 1-4, CVT 40 is positioned rearward of engine 26, forward of rear wheel 24 and outside of cradle portion 27 of frame 12 that supports engine 26. Also, the axis of rotation 49 of rotatable input member 42 and the axis of rotation 51 of rotatable output member 44 of CVT 40 are rearward of the pivot axis 70, about which swing-arm assembly 16 can pivot. CVT 40 can be positioned laterally between fork members 84, 86, which enhances the aesthetic appeal of the motorcycle 10. The reduction gearset 60 can also be positioned laterally between the fork members 84 and 86.

The locations and spatial orientations of CVT 40 and reduction gearset 60 result in several advantages. For example, positioning the CVT 40 rearward of engine 26 and vertically orienting CVT 40 (as shown in FIGS. 1-8) allows motorcycle 10 to remain sufficiently narrow in the area below seat 20 to avoid interference with the rider's legs and feet, without increasing the overall length of motorcycle 10 and while realizing the benefit of incorporating a CVT. Also, positioning reduction gearset 60 forward of rear wheel 24 maintains a traditional motorcycle "look" for motorcycle 10 as compared to a scooter, for example, that may typically have at least one gear of a reduction gearset mounted on or adjacent to the hub of the rear wheel. Additionally, positioning reduction gearset 60 forward of rear wheel 24 (FIG. 7), significantly reduces the unsprung weight of motorcycle 10. Reducing the unsprung weight can enhance the dynamics, balance and handling characteristics of motorcycle 10. In addition, positioning the reduction gearset 60 forward of rear wheel 24 allows the final drive ratio of motorcycle 10 to be changed by simply replacing one or both of drive member 90 and driven member 92. The configuration of motorcycle 10, with respect to CVT 40 and reduction gearset 60, also allows standard motorcycle squat and anti-squat characteristics to be achieved, as opposed to those of a typical scooter configuration, for example.

While the present invention has been illustrated by the description of various embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A motorcycle comprising:
a frame;
an engine supported by the frame;
a continuously variable transmission operatively and indirectly driven by the engine, the continuously variable transmission being supported by the frame;
a rotatable rear wheel operatively and indirectly driven by the continuously variable transmission;
a pivot shaft associated with the frame and defining a pivot axis;
a swing-arm assembly pivotably coupled at a forward end thereof to the frame for rotation about the pivot axis, the swing-arm assembly being coupled at a rear end thereof to the rear wheel; wherein
the continuously variable transmission comprises a rotatable input member having a first axis of rotation, the rotatable input member being operatively and indirectly driven by the engine;
the first axis of rotation of the rotatable input member of the continuously variable transmission is rearward of the pivot axis and forward of the rear wheel; and
the continuously variable transmission is generally vertically oriented.

2. The motorcycle of claim 1, wherein:
the continuously variable transmission further comprises a rotatable output member coupled to the rotatable input member, the rotatable output member having a second axis of rotation that is rearward of the pivot axis and forward of the rear wheel.

3. The motorcycle of claim 2, wherein:
the rotatable input member of the continuously variable transmission comprises a drive pulley;
the rotatable output member of the continuously variable transmission comprises a driven pulley; and
the continuously variable transmission further comprises a belt coupling the drive pulley and the driven pulley.

4. The motorcycle of claim 2, wherein:
the swing-arm assembly comprises first and second elongated fork members, the first and second elongated fork members being laterally spaced from one another; and
at least a portion of the continuously variable transmission is positioned laterally between the first and second elongated fork members.

5. The motorcycle of claim 2, wherein:
at least a portion of the rotatable input member of the continuously variable transmission is positioned above the swing-arm assembly; and
at least a portion of the rotatable output member of the continuously variable transmission is positioned below the swing-arm assembly.

6. A motorcycle comprising:
a frame;
an engine supported by the frame;
a continuously variable transmission;
a first flexible drive member coupling the engine and the continuously variable transmission;
a second flexible drive member;
a rotatable rear wheel operatively and indirectly driven by the continuously variable transmission;
a swing-arm assembly pivotably coupled at a forward end thereof to the frame for rotation about a pivot axis, the swing-arm assembly being coupled at a rear end thereof to the rear wheel; wherein
the continuously variable transmission is generally vertically oriented;
the continuously variable transmission comprises a rotatable input member and a rotatable output member;
the second flexible drive member couples the rotatable input member and the rotatable output member; and
the rotatable input member has an axis of rotation rearward of the pivot axis.

7. The motorcycle of claim 6, wherein:
the rotatable input member of the continuously variable transmission comprises a drive pulley;
the rotatable output member of the continuously variable transmission comprises a driven pulley; and
wherein the second flexible drive member comprises a belt coupling the drive pulley with the driven pulley.

8. The motorcycle of claim 6, wherein:
the continuously variable transmission is rearward of the engine and forward of the rear wheel.

9. The motorcycle of claim 6, further comprising:
a third flexible drive member; wherein
the third flexible drive member facilitates coupling the continuously variable transmission with the rear wheel.

10. A motorcycle comprising:
a frame;
an engine supported by the frame, the engine comprising a crankshaft;
a continuously variable transmission operatively and indirectly driven by the engine;
a rear wheel operatively and indirectly driven by the continuously variable transmission; wherein
the continuously variable transmission comprises a rotatable input member coupled to the crankshaft and a rotatable output member coupled to the rotatable input member, the rotatable input member having a first axis of rotation, the rotatable output member having a second axis of rotation;
the continuously variable transmission is positioned forward of the rear wheel and each of the first axis of rotation and the second axis of rotation is rearward of the crankshaft and forward of the rear wheel;

a pivot shaft defining a pivot axis; and a swing-arm assembly pivotably coupled at a forward end thereof to the frame for rotation about the pivot axis, the swing-arm assembly being coupled at a rear end thereof to the rear wheel; wherein each of the first axis of rotation and the second axis of rotation is rearward of the pivot axis.

11. The motorcycle of claim 10, wherein:

the frame comprises a cradle that at least partially surrounds and supports the engine; and the continuously variable transmission is positioned at least substantially outside of the cradle.

12. The motorcycle of claim 10, wherein:

the rotatable input member of the continuously variable transmission comprises a drive pulley;

the rotatable output member of the continuously variable transmission comprises a driven pulley; and the continuously variable transmission further comprises a belt coupling the drive pulley and the driven pulley.

13. The motorcycle of claim 10, wherein:

the continuously variable transmission is generally vertically oriented.

14. The motorcycle of claim 13, further comprising:

a reduction gearset operatively driven by the continuously variable transmission.

15. The motorcycle of claim 14, wherein:

the continuously variable transmission further comprises an input shaft and an output shaft, the input shaft being coupled with the crankshaft;

the reduction gearset comprises an input gear, an output gear and an intermediate gear meshed with the input gear and the output gear;

the input gear of the reduction gearset is mounted on the output shaft of the continuously variable transmission, for rotation therewith; and the output gear of the reduction gearset is mounted on the pivot shaft, for rotation therewith.

16. The motorcycle of claim 14, wherein:

the swing-arm assembly comprises first and second elongated fork members, the first and second elongated fork members being laterally spaced from one another; and at least a portion of the continuously variable transmission is positioned laterally between the first and second elongated fork members.

* * * * *